United States Patent Office 3,766,181
Patented Oct. 16, 1973

3,766,181
ISOCYANURATE ADDITION PRODUCTS
WITH LACTONES
John E. Pregler, Wallingford, Conn., assignor to
Olin Corporation
No Drawing. Filed Mar. 8, 1972, Ser. No. 232,899
Int. Cl. C07d 55/38
U.S. Cl. 260—248 NS      16 Claims

ABSTRACT OF THE DISCLOSURE

Additional products are prepared from substituted isocyanurates and lactones. These addition products are useful in the preparation of urethane coatings.

This invention relates to additional products of isocyanurates. More particularly, the invention relates to addition products of certain substituted isocyanurates with lactones, and to a process for preparing them.

The utility of isocyanurates as cross-linking agents for resins is known in the art. When used as cross-linking agents in urethane systems, these isocyanurates impart several highly desirable properties to coatings and films prepared from such systems. These include excellent low temperaure flexibility and improved resistance to weathering, thermal aging and ultraviolet light.

However, one major obstacle to the use of this group of cross-linking agents has been their poor solubility in conventional urethane solvents. This solubility problem was recognized in U.S. Pat. 3,174,950 to Cordier. Thus special formulation techniques and solvents have had to be used in preparing urethane coating compositions incorporating isocyanurate crosslinking agents; and due to the added cost involved, which in some applications may be economically prohibitive, the utility of isocyanurates in urethane systems has not been fully exploited.

In accordance with this invention, it has been found that when substituted isocyanurates are reacted with lactones, new addition products are formed. These isocyanurate-lactone addition products are soluble in conventional solvents, and they are highly cross-linking agents for resinous materials. This makes practicable their wide utility in urethane systems such as used in the preparation of protective coatings.

According to the process of the invention, these additional products are obtained by reacting a substituted isocyanurate with a lactone at elevated temperatures and in the presence of a reaction catalyst.

More in detail, the substituted isocyanurates used in preparing the addition products of this invention are represented by Formula I as follows

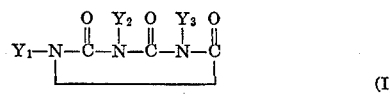

(I)

wherein each of $Y_1$, $Y_2$ and $Y_3$ is independently selected from the group consisting of an alkyl group containing 1 to 12 carbon atoms and terminally substituted by an OH, SH, or $NH_2$ group; a cycloalkyl group containing 6 to 20 carbon atoms and having at least one substituent selected from an OH, SH, or $NH_2$ group; and an aryl group containing 6 to 20 carbon atoms and having at least one substituent selected from an OH, SH, or $NH_2$ group.

These isocyanurates are well known in the art and several methods are available for preparing them. See for example J. Org. Chem. 25, 1944–1946 (1960); E. M. Smolin and L. Rapoport, s-Triazines and Derivatives Interscience, 1959, pp. 389–422; and Japan Chemical Quarterly 3 (No. 3) 19–23 (1967).

Illustrative examples of the substituted isocyanurates represented by Formula I include:

tris(2-hydroxyethyl)isocyanurate
tris(2-thioethyl)isocyanurate
tris(3-hydroxypropyl)isocyanurate
tris(3-aminopropyl)isocyanurate
1-(3-aminopropyl)-3,5-bis(3-hydroxypropyl)isocyanurate
1,3-bis(4-hydroxybutyl)-5-(4-thiobutyl)isocyanurate
1-(3-aminopropyl)-1,3,5-bis(2-hydroxyethyl)isocyanurate
1,3-bis(hydroxyphenyl)-5-(thiophenyl)isocyanurate
tris(4-hydroxybutyl)isocyanurate
tris(8-hydroxyoctyl)isocyanurate
tris(hydroxyphenyl)isocyanurate
tris(aminobenzyl)isocyanurate
tris(thiotolyl)isocyanurate
tris(aminocyclohexyl)isocyanurate
tris(6-hydroxyhexyl)isocyanurate
tris(4-thiobutyl)isocyanaurate
tris(3,5-ditert-butyl-4-hydroxphenyl)isocyanurate Although any of the substituted isocyanurates represented by Formula I may be employed, it is preferred to use isocyanurates wherein each of $Y_1$, $Y_2$ and $Y_3$ is independently an alkyl group containing 1 to 8 carbon atoms and terminally substituted with OH, SH, or $NH_2$, the OH group being a particularly preferred terminal substituent.

Illustrative examples of the preferred isocyanurates include:

tris(hydroxymethyl)isocyanurate
tris(2-hydroxyethyl)isocyanurate
tris(2-thioethyl)isocyanurate
tris(3-hydroxypropyl)isocyanurate
tris(3-aminopropyl)isocyanurate
1-(3-aminopropyl)-3,5-bis(3-hydroxypropyl)isocyanurate
1,3-bis(4-hydroxybutyl)-5-(4-thiobutyl)isocyanurate
1-(3-aminopropyl)-3,5-bis(2-hydroxylethyl)isocyanurate
tris(4-hydroxybutyl)isocyanurate
tris(4-thiobutyl)isocyanurate
tris(5-aminopentyl)isocyanurate
tris(6-hydroxyhexyl)isocyanurate
tris(7-hydroxyheptyl)isocyanurate
tris(8-hydroxyoctyl)isocyanurate In the most preferred embodiments of the invention the substituted isocyanurates of Formula I are employed in which each of $Y_1$, $Y_2$ and $Y_3$ is independently an alkyl group containing 1 to 4 carbon atoms and terminally substituted with an OH group. Illustrative examples include:

tris(hydroxymethyl)-,
tris(2-hydroxyethyl)-,
tris(3-hydroxypropyl)-,
and tris(4-hydroxybutyl)isocyanurate.

A large variety of lactones can be used in preparing the addition products of the invention. These lactones are represented by Formula II as follows:

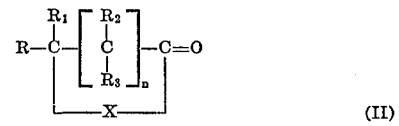

(II)

where each of R, $R_1$, $R_2$, and $R_3$ is independently selected from the group consisting of hydrogen,
alkyl groups containing 1 to 12 carbon atoms,
cycloalkyl groups containing 3 to 12 carbon atoms,
aralkyl groups containing 7 to 17 carbon atoms, and
aryl groups containing 6 to 14 carbon atoms, X is oxygen or sulfur, and
n is an integer from 1 to 9.

Illustrative lactones represented by Formula II include:

β-propiolactone
α,α-diphenyl-β-propiolactone
β,β-dimethyl-β-propiothiolactone
β- and γ-butyrolactone
β- and γ-butyrothiolactone
γ-methyl-γ-phenylbutyrolactone
β-methyl-β-ethyl-γ-butyrothiolactone
δ- and γ-valerolactone
δ- and γ-valerothiolactone
γ-vinyl-γ-valerolactone
β,β-diethyl-δ-valerolactone
α,α,δ,δ-tetramethyl-ε-thiocaprolactone
α,α,γ,δ,δ-pentamethyl-ε-thiocaprolactone
γ-, δ-, and ε-caprolactone
γ-, δ-, and ε-caprothiolactone
methyl caprolactone
α-butyl-ε-caprolactone
α-octyl-ε-caprolactone
methylthiocaprolactone
γ-pimelolactone
γ-caprylolactone
γ-decalactone
β-isocaprolactone Although any of the lactones represented by Formula II may be employed in preparing the addition products of this invention, it is preferred to employ those lactones in which each of R, $R_1$, $R_2$ and $R_3$ is independently hydrogen or an alkyl group having 1 to 8 carbon atoms and $n$ is an integer from 1 to 6.

Illustrative of the preferred lactones are:

β-propiolactone
β,β-dimethyl-β-propiothiolactone
β- and γ-butyrolactone
β- and γ-butyrothiolactone
β-methyl-β-ethyl-γ-butyrothiolactone
δ- and γ-valerolactone
δ- and γ-valerothiolactone
β,β-diethyl-δ-valerolactone
γ-, δ- and ε-caprolactone
methyl caprolactone
α-butyl-ε-caprolactone
α-octyl-ε-caprolactone
methylthiocaprolactone
γ-pimelolactone
γ-caprylolaltone
β-isocaprolactone
γ-δ- and ε-caprothiolactone
α,α,δ,δ-tetramethyl-ε-thiocaprolactone
α,α,γ,δ,δ-pentamethyl-ε-thiocaprolactone The lactones of Formula II in which X is oxygen are particularly preferred for use according to the invention. These include for example propiolactone, butyrolactone, valerolactone, diethyl valerolactone, caprolactone, methyl caprolactone, butyl caprolactone, and pimelolactone.

The reaction between the substituted isocyanurate and the lactone is carried out, according to the process of this invention, using any suitable molar ratio of reactants. Usually, however, at least one mole of lactone is employed per mole of substituted isocyanurate. Thus from 1 to about 45 moles, and preferablly from about 1.5 to about 12 moles, of lactone are employed per each mole of substituted isocyanurate.

Any suitable catalyst which is effective in promoting the addition reaction may be used. The preferred catalysts, however, are acid catalysts of which sulfuric acid and boron trifluoride are illustrative. These catalysts are employed in any suitable catalytic proportion such as from about 0.05 to about 4% and preferably about 0.3–1.5%, by weight based on the aggregate weight of the substituted isocyanurate and the lactone.

The reaction is carried out at elevated temperatures, for example about 50–200° C., and preferably about 60–130° C.

Although the reaction proceeds in the absence of a solvent, in some applications it may be desirable to effect the reaction in a solvent medium. When it is desired to use a solvent, a variety of solvents or mixtures thereof may be employed, provided they are inert and do not interfere with the addition reaction. Illustrative groups of suitable solvents include ketones, esters, and hydrocarbon solvents.

Any convenient order of mixing the reactants together and effecting the reaction may be employed. For example, the desired proportions of reactants and catalyst may be simultaneously placed in a reaction vessel. The mixture is then heated with agitation until such time, usually 1–4 hours, as the reaction is complete. The reaction product, which is usually a viscous, homogeneous liquid, may then be dissolved in an appropriate solvent to enable neutralizing the catalyst, the solvent being thereafter stripped off. Thus obtained, the addition products of the invention can be used as is, although they may optionally be subjected to further purification if desired.

The isocyanurate-lactone addition products of this invention are highly effective cross-linking agents for resinous materials. Being soluble in conventional urethane solvents, such as toluene, methylene ethyl ketone or butylacetate, they are of particular utility in formulating urethane coating compositions having several highly desirable properties. These include outstanding low temperature flexibility and improved resistance to thermal aging, weathering, and ultraviolet light. A detailed description of the utility of the addition products of the invention in urethane coating compositions is provide in co-pending application, Ser. No. 232,918, filed Mar. 8, 1972.

The following examples are provided to illustrate the invention.

EXAMPLE I

To a 3-necked 500-ml. flask equipped with a stirrer, condenser and nitrogen purge there were added 114.14 grams of 6-hexanolactone (1 mole) and 87 grams of tris(2-hydroxyethyl)isocyanurate (0.33 mole). The contents were heated to 100° C. with stirring to dissolve the tris(2-hydroxyethyl)isocyanurate. Then 9 drops of concentrated $H_3SO_4$ was added. The reaction proceeded for about two hours at the end of which the plum color of the reaction mixture disappeared. The product was then dissolved in methylene chloride followed by the addition of triethylamine to neutralize the sulfuric acid. This mixture was washed with water to remove the excess amine and any salts formed and then stripped under vacuum at 100° C. and 2 mm. Hg to remove any water. The product thus obtained weighed 149 grams which corresponded to a calculated 74% yield based on the weight of reactants used. It was a homogeneous, amber colored liquid having a viscosity of 46.3 stokes (using the Gardner bubble viscometer). The hydroxyl number of the product was determined by acetylation to be 213, and based on this, a molecular weight of about 789. This molecular weight was confirmed using the Fischer Osmosis Method.

EXAMPLE II

The addition product of Example I (23.12 g.) was admixed with 100 g. polycaprolactone (Union Carbide D–540), 143.6 g. of a solvent mixture of xylene (75% by weight) and cellulose acetate (25% by weight), and 30 g. toluene diisocyanate at a temperature of 80° C. for 16 hours. The resulting moisture-curable composition was successfully used in spray-coating an aluminum substrate.

EXAMPLE III

Following the procedure of Example I, 72 grams (1 mole) of β-propiolactone and 87 grams (0.33 mole) of tris(2-hydroxyethyl)isocyanurate were reacted in the presence of 1 ml. of $BF_3$ and 50 ml. of toluene. The mixture was slowly heated and the temperature kept below 100° C. for about two hours and a solution of 100 ml. of dichloromethane in 100 ml. $H_2O$ was added. After separation, 145 grams of addition product was obtained (91% yield).

What is claimed is:

1. A process for preparing an isocyanurate-lactone addition product which comprises reacting together, in the presence of a catalyst, (a) a substituted isocyanurate of the formula

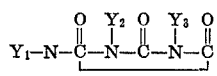

wherein each of $Y_1$, $Y_2$ and $Y_3$ is independently an alkyl group having 1 to 8 carbon atoms and terminally substituted with OH, SH, or $NH_2$, and (b) per each mole of said substituted isocyanurate, a proportion of at least one mole of a lactone having the formula

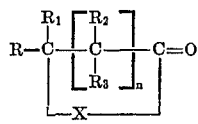

wherein each of R, $R_1$, $R_2$ and $R_3$ is independently hydrogen, or an alkyl group having 1 to 8 carbon atoms, $n$ is an integer from 1 to 6, and X is oxygen or sulfur, said reaction being carried out at an elevated temperature.

2. The process of claim 1 wherein said catalyst is an acid catalyst.

3. The process of claim 2 wherein X in said lactone is oxygen.

4. The process of claim 2 wherein each of $Y_1$, $Y_2$ and $Y_3$ in said substituted isocyanurate is terminally substituted with OH.

5. The process of claim 4 wherein X in said lactone is oxygen.

6. The process of claim 5 wherein each of $Y_1$, $Y_2$ and $Y_3$ in said substituted isocyanurate is independently an alkyl group having 1 to 4 carbon atoms.

7. The process of claim 6 wherein the proportion of said lactone ranges from about 1.5 to about 12 moles per each mole of said substituted isocyanurate.

8. The process of claim 7 wherein said elevated temperature ranges from about 50 to about 200° C.

9. The process of claim 8 wherein said substituted isocyanurate is tris(2-hydroxyethyl)isocyanurate.

10. The process of claim 8 wherein said lactone is caprolactone or β-propiolactone.

11. The process of claim 8 wherein said catalyst is sulfuric acid or boron trifluoride.

12. The process of claim 11 wherein said substituted isocyanurate is tris(2-hydroxyethyl)isocyanurate, said lactone is caprolactone or β-propiolactone, and said elevated temperature ranges from about 60 to 130° C.

13. An addition product prepared by the process of claim 1.

14. An addition product prepared by the process of claim 2.

15. An addition product prepared by the process of claim 7.

16. An addition product prepared by the process of claim 12.

References Cited
UNITED STATES PATENTS 3,576,009   4/1971   Magnien et al. _____ 260—343

JOHN M. FORD, Primary Examiner

U.S. Cl. X.R.

260—7.5 SS, 77.5 NC, 77.5 AN